(12) United States Patent
Asai et al.

(10) Patent No.: US 11,313,342 B2
(45) Date of Patent: Apr. 26, 2022

(54) WAVE-ACTIVATED POWER GENERATION DEVICE AND WAVE-ACTIVATED POWER GENERATION METHOD

(71) Applicant: University of Tsukuba, Ibaraki (JP)

(72) Inventors: Takehiko Asai, Ibaraki (JP); Ruriko Haraguchi, Ibaraki (JP); Yoshikazu Araki, Aichi (JP)

(73) Assignee: University of Tsukuba, Ibaraki (JP)

( * ) Notice: Subject to any disclaimer, the term of this patent is extended or adjusted under 35 U.S.C. 154(b) by 334 days.

(21) Appl. No.: 16/621,772

(22) PCT Filed: Aug. 21, 2018

(86) PCT No.: PCT/JP2018/030841
§ 371 (c)(1),
(2) Date: Dec. 12, 2019

(87) PCT Pub. No.: WO2019/039471
PCT Pub. Date: Feb. 28, 2019

(65) Prior Publication Data
US 2020/0141379 A1    May 7, 2020

(30) Foreign Application Priority Data
Aug. 21, 2017   (JP) .............................. JP2017-158848

(51) Int. Cl.
*F03B 13/18* (2006.01)
(52) U.S. Cl.
CPC .................................... *F03B 13/18* (2013.01)
(58) Field of Classification Search
CPC .... F03B 13/18; F03B 15/00; F05B 2270/202; F05B 2280/5001; Y02E 10/30

USPC ...................... 60/497, 499, 504; 290/42, 53
See application file for complete search history.

(56) References Cited

U.S. PATENT DOCUMENTS

| 4,228,360 A | 10/1980 | Navarro |
| 6,300,689 B1 | 10/2001 | Smalser |
| 10,040,413 B2 | 8/2018 | Inagaki et al. |
| 2009/0200806 A1* | 8/2009 | Al-Huwaider ...... F03B 13/1865 290/53 |
| 2011/0018277 A1 | 1/2011 | Brace |

(Continued)

FOREIGN PATENT DOCUMENTS

| JP | 2010-525214 | * | 7/2010 |
| JP | 2013-527378 | * | 6/2013 |
| JP | 2013-155609 |   | 8/2013 |

(Continued)

OTHER PUBLICATIONS

International Search Report dated Nov. 6, 2018 with respect to PCT/JP2018/030841.

(Continued)

*Primary Examiner* — Hoang M Nguyen
(74) *Attorney, Agent, or Firm* — IPUSA, PLLC

(57) ABSTRACT

A wave-activated power generation device is disclosed. The device includes a float configured to be capable of floating in the sea; a rotor configured to generate a rotational inertial mass effect; a power generator configured to generate power based on rotation of the rotor; a first elastic body; and a drive part configured to connect the rotor with the float via the first elastic body so as to rotate the rotor along with movement of the float.

8 Claims, 13 Drawing Sheets

(56) References Cited

U.S. PATENT DOCUMENTS

2017/0250627 A1    8/2017  Hasegawa et al.
2018/0355837 A1*  12/2018  Bonutti ............... F03B 13/1855

FOREIGN PATENT DOCUMENTS

| | | |
|---|---|---|
| JP | 2013-181433 | 9/2013 |
| JP | 2016-144249 | 8/2016 |
| JP | 2017-132336 | 8/2017 |
| WO | 2008/130295 | 10/2008 |
| WO | 2011/149397 | 12/2011 |
| WO | 2013/036276 | 3/2013 |
| WO | 2015/044795 | 4/2015 |

OTHER PUBLICATIONS

Extended European Search Report dated Nov. 19, 2020 issued with respect to the corresponding European Patent Application No. 18849164.1.

* cited by examiner

FIG.3

| WAVE PERIOD | $m_s = 1101$ kg $Y = 0.001835\ \Omega^{-1}$ | $k_t = 3.9766 \times 10^3$ N/m | | |
|---|---|---|---|---|
| | | $m_s = 2010$ kg $Y = 0.0011\ \Omega^{-1}$ | $m_s = 3071$ kg $Y = 0.0007339\ \Omega^{-1}$ | $m_s = 4283$ kg $Y = 0.0007339\ \Omega^{-1}$ | $m_s = 5646$ kg $Y = 0.0007339\ \Omega^{-1}$ |
| 4s | 2464 | 605.25 | 109.45 | 42.53 | 20.89 |
| 5s | 620.91 | 1375 | 226.42 | 52.26 | 20.19 |
| 6s | 233.91 | 339.49 | 926.6 | 176.38 | 43.547 |
| 7s | 133.02 | 132.09 | 226.68 | 718 | 162.17 |
| 8s | 91.51 | 75.78 | 84.98 | 200.73 | 595.87 |

| Parameters | Values |
|---|---|
| M | 10000 kg |
| D | 2 m |
| H | 5 m |
| $c_s$ | 50 N s/m |
| $k_s$ | 83.73 N/m |
| $C_w$ | 2093 N s/m |
| $K_e$ | 500 V s/m |
| R | 25 Ω |
| $\rho$ | 1027 kg/m³ |

| FREQUENCY RANGE | TARGET VALUE $m_{tar}$ OF ROTATIONAL INERTIA MASS $m_s$ | TARGET VALUE $Y_{tar}$ OF ADMITTANCE Y |
|---|---|---|
| fa1 to fa2 | m1 | Y1 |
| fa2 to fa3 | m2 | Y2 |
| fa3 to fa4 | m3 | Y3 |
| ... | ... | ... |

FIG.15

| MODEL | A | B | C |
|---|---|---|---|
| POWER GENERATION EFFICIENCY | × | △ | ○ |
| SIMPLICITY OF MECHANISM | ○ | × | △ |

WAVE-ACTIVATED POWER GENERATION DEVICE AND WAVE-ACTIVATED POWER GENERATION METHOD

TECHNICAL FIELD

The present invention relates to a wave-activated power generation device and a wave-activated power generation method.

BACKGROUND ART

A wave-activated power generation device has been known that includes a conversion mechanism to convert movement of a float oscillated by waves into rotational motion; a rotating shaft to be rotated by rotating force extracted through the conversion mechanism; and a power generator unit to be driven by the rotating shaft so as to generate power (see, for example, Patent Document 1).

RELATED ART DOCUMENTS

Patent Document

Patent Document 1: Japanese Laid-Open Patent Application 2013-181433

SUMMARY OF THE INVENTION

Problem to be Solved by the Invention

However, in the conventional technology as described above, it is difficult to increase the rotational inertial mass effect so as to increase the power generation efficiency, because the movement of the float is directly input into the conversion mechanism (without having an elastic body interposed).

Thereupon, in one aspect, it is an object of the present invention to provide a wave-activated power generation device and a wave-activated power generation method that can increase the rotational inertial mass effect so as to increase the power generation efficiency.

Means for Solving the Problem

In order to achieve the object described above, according to one aspect of the present invention, a wave-activated power generation device is provided that includes a float configured to be capable of floating in the sea; a rotor configured to generate a rotational inertial mass effect; a power generator configured to generate power based on rotation of the rotor; a first elastic body; and a drive part configured to connect the rotor with the float via the first elastic body so as to rotate the rotor along with movement of the float.

Effects of the Invention

According to the present invention, it is possible to obtain a wave-activated power generation device and a wave-activated power generation method that can increase the rotational inertial mass effect so as to increase the power generation efficiency.

BRIEF DESCRIPTION OF THE DRAWINGS

FIG. 3 is a table illustrating calculation results related to an optimum solution;

FIG. 15 illustrates compared results of the power generation efficiency and the mechanism simplicity among the models in FIGS. 14A to 14C.

EMBODIMENTS FOR CARRYING OUT THE INVENTION

In the following, with reference to the drawings, the best mode for implementing the present invention will be described.

In the present description, a "stationary object" is a concept that includes an object that is practically fixed to the earth, including not only a natural object but also an artifact. Also, "practically fixed" means that the object is not displaced in response to waves, and denotes a concept that includes a support form that is less displaced than a float 30, as will be described later.

Figure 1:
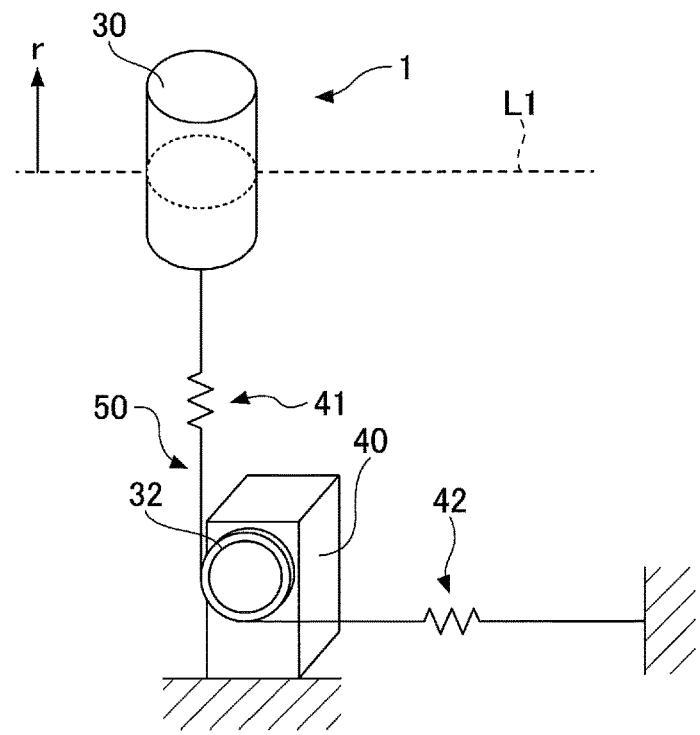
FIG. 1 is a schematic diagram of a wave-activated power generation device 1 according to an example embodiment.

FIG. 1 is a schematic diagram of a wave-activated power generation device 1 according to an example embodiment. In FIG. 1, the sea level is schematically indicated by a dashed line L1.

The wave-activated power generation device 1 includes a float 30, a rotor 32, a power generator 40, a tuning spring 41 (an example of a first elastic body), a supporting spring 42 (an example of a second elastic body), and a drive part 50.

The float 30 may be any object that is capable of floating in the sea and may take a form of a so-called buoy. The size or mass of the float 30 can be determined discretionarily; the mass may be, for example, approximately 10 tons. The float 30 is displaced relative to a stationary object in response to waves. In the following, displacing in response to waves is also referred to as "shaking". Here, focusing on the vertical component of the shaking float 30, movement of the float 30 in the vertical direction in response to waves will be referred to as "oscillation." In general, the period of waves generated on the sea surface varies with changes in environmental conditions caused by weather, seasons, and the like. Therefore, the frequency of the oscillation of the float 30 is not constant at all times and varies with changes in the environmental conditions.

The rotor 32 generates a rotational inertial mass effect. The rotor 32 is mounted on an input shaft (rotational shaft) of the power generator 40. However, the rotor 32 may be integrally formed with the input shaft of the power generator 40. Alternatively, the rotor 32 may be connected to the input shaft of the power generator 40 via a gear and the like. The rotor 32 is given running torque to be rotated by the drive part 50 as will be described later. At this time, the rotor 32 gives the running torque to the input shaft of the power generator 40. The rotational inertial mass effect generated by the rotor 32 is significantly greater than the rotational inertial mass effect generated by the input shaft itself of the power generator 40. In other words, the rotor 32 adds a significant rotational inertial mass effect to the rotational inertial mass effect generated by the input shaft itself of the power generator 40. The rotational inertial mass related to the rotational inertial mass effect generated by the rotor 32 is favorably greater than or equal to, for example, 3% of the mass of the float 30, and more favorably greater than or equal to 10% or more of the mass of the float 30. In the following, unless otherwise noted, the rotational inertial mass effect relates to the rotor 32. The rotational inertial mass effect will be described in further detail later.

The power generator 40 generates electric power based on the rotation of the rotor 32. The power generator 40 is fixed to a stationary object on the stator side. For example, in the case where the power generator 40 is installed under the sea as illustrated in FIG. 1, the power generator 40 is fixed to a stationary object at the bottom of the sea on the stator side. The power generator 40 is arranged such that the input axis extends in a virtually horizontal direction.

The tuning spring 41 has a predetermined spring constant $k_t$ [N/m]. The tuning spring 41 is connected in series with the drive part 50. The connection position of the tuning spring 41 is set between the float 30 and the rotor 32. The tuning spring 41 is built into the drive part 50, for example, within a section between the float 30 and the rotor 32. For example, the drive part 50 may have multiple partitioned members to have the tuning spring 41 connected between the members. Alternatively, the tuning spring 41 may be integrally formed with the drive part 50. Alternatively, the tuning spring 41 may have one of its ends connected to the float 30 and the other end connected to the drive part 50.

The spring constant $k_t$ of the tuning spring 41 is set so that the rotational inertial mass of the rotor 32 resonates with oscillation of the float 30 when the float 30 oscillates at a frequency of interest $f_{ref}$. The frequency of interest $f_{ref}$ can be determined discretionarily; for example, a representative value among various frequencies of the oscillation of the float 30 generated by waves generated at the installation location of the wave-activated power generation device 1 may be used. "Resonation of the rotational inertial mass of the rotor 32 with the oscillation of the float 30" will be described in more detail later.

The supporting spring 42 has a predetermined spring constant $k_s$ [N/m]. The supporting spring 42 is connected in series with the drive part 50. The connection position of the supporting spring 42 is set between the rotor 32 and a stationary object (in the example in FIG. 1, a stationary object on the sea floor). The supporting spring 42 is built into the drive part 50, for example, within a section between the rotor 32 and the stationary object. For example, the drive part 50 may have multiple partitioned members to have the supporting spring 42 connected between the members. Alternatively, the supporting spring 42 may be integrally formed with the drive part 50. Alternatively, the supporting spring 42 may have one of its ends connected to the stationary and the other end connected to the drive part 50.

The supporting spring 42 is maintained to have an elongation of zero or greater so that the drive part 50 does not loosen due to movement of the float 30. Therefore, the supporting spring 42 has a function of maintaining the tension of the drive part 50 to be greater than or equal to zero.

The drive part 50 has a linear form such as a cable, wire, chain, belt, or the like, and has a spring constant of virtually zero. As schematically illustrated in FIG. 1, the drive part 50 has one of its ends connected to the float 30 via the tuning spring 41 and has the other end connected to the stationary object via the supporting spring 42.

As illustrated in FIG. 1, the drive part 50 has a vertical section extending in the vertical direction and a horizontal section extending in the horizontal direction. Note that in the example illustrated in FIG. 1, the tuning spring 41 is provided in the vertical section, and the supporting spring 42 is provided in the horizontal section. A bend between the vertical section and the horizontal section is formed around the rotor 32. However, in a modified example, the bend between the vertical section and the horizontal section may be formed by a separate pulley or the like which is different from the rotor 32.

The drive part 50 rotates the rotor 32 along with the movement of the float 30. In the present example embodiment, the drive part 50 rotates the rotor 32 along with the oscillation of the float 30. Any transmission mechanism can be adopted between the drive part 50 and the rotor 32. For example, the drive part 50 rotates the rotor 32 through a transmission mechanism of a gear and a chain. In this case, the drive part 50 integrally includes a chain engaging the gear, and the rotor 32 is connected to the gear in a form of rotating along with the rotation of the gear. Alternatively, the drive part 50 may rotate the rotor 32 via a transmission mechanism of a belt and pulley. In this case, the drive part 50 integrally includes the belt wound around the pulley and the rotor 32 is connected to the pulley in a form such that the rotor 32 rotates along with the rotation of the pulley.

Figure 2:
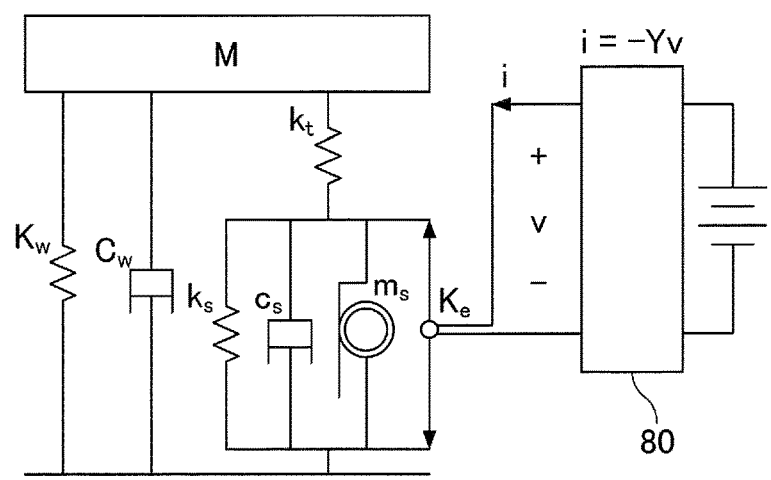
FIG. 2 is a diagram illustrating a model of the wave-activated power generation device 1 illustrated in FIG. 1.

FIG. 2 is a diagram illustrating a model of the wave-activated power generation device 1 illustrated in FIG. 1. FIG. 2 also schematically illustrates a control circuit 80 (an example of a control device) of the wave-activated power generation device 1.

In FIG. 2, M represents the sum of added mass of water acting on the float 30 and the mass of the float 30; $K_w$ and $C_w$ represent the spring constant [N/m] and the damper constant [N s/m] of spring and damper effects, respectively, of a fluid (sea water) acting on the float 30; $k_t$ and $k_s$ represent the spring constants of the tuning spring 41 and the supporting spring 42, respectively; $c_s$ represents the damping constant of the damper effect in the power generator 40; and $m_s$ represents the rotational inertial mass [kg] of the rotor 32. Also, $K_e$ represents the back electromotive force constant [V s/m] of the power generator 40.

The control circuit 80 includes a power converter (not illustrated); the power converter is a one-way converter that includes a switching element such as a single metal oxide semiconductor field-effect transformer (MOSFET). In this case, pulse width modulation (PWM) control for the single switching element becomes easier and parasitic loss can be reduced. The current i [A] flowing through the power generator 40 can be expressed as follows:

$i = -Y v$ where Y represents the admittance [1/Ω] and v represents the voltage (potential difference) [V]. The admittance Y is variable within a range below a predetermined upper limit by varying the duty ratio when turning the switching element on and off.

Denoting a control input by u, behavior of the model illustrated in FIG. 2 when the control input u is given can be expressed as follows, considering the balance:

$$m_s \ddot{r}_s + c_s \dot{r}_s + k_s r_s = f_t - u \quad \text{Formula 1}$$

where a dot represents a time derivative, and double dots represent a second-order time derivative. Denoting the elongation of the tuning spring 41 by $r_t$ and the elongation of the supporting spring 42 by $r_s$, $$r = r_t + r_s$$

where r represents the displacement of oscillation of the float 30 (see FIG. 1). Also, $f_t$ represents the force (elastic force) of the tuning spring 41 and has the following relationship.

$$f_t = k_t r_t = k_t (r - r_s)$$

where $k_t$ is the spring constant of the tuning spring 41 as described above, and is constrained to be greater than 0. The following relationship holds for the control input u.

$$u = -K_e i$$

Also, behavior of the float 30 can be expressed as follows:

$$M\ddot{r} = f_a - C_w \dot{r} - K_w r - f_t \quad \text{Formula 2}$$

where $f_a$ represents a force received by the float 30 from waves. For example, it may be assumed that the force $f_a$ received by the float 30 from the waves is expressed as white noise processed by a bandpass filter having the following power spectral density $S_a(\omega)$.

$$S_a(\omega) = \left| \frac{jq\omega}{-\omega^2 + 2j\zeta_a \omega_a \omega + \omega_a^2} \right| \quad \text{[Formula 3]}$$

where j represents the imaginary unit ($j^2 = -1$); $\omega$ represents the angular velocity [rad/s] related to the wave oscillation; $\omega_a$ represents the center of the passing band of the bandpass filter; and $\zeta_a$ represents a spread of frequency components (e.g., a spread of periods of waves due to disturbance). The power generation output Pg can be expressed as follows:

$$Pg = -iv - Ri^2$$

where R represents the resistance. From these relationships, although a detailed description is omitted, there exit an admittance Y, a spring constant $k_t$, and a rotational inertial mass $m_s$ of the rotor 32 that maximize the power generation output Pg when the float 30 oscillates at a certain frequency $f_{ref}0$. In the present specification, realizing such an optimum solution is expressed as "the rotational inertial mass of the rotor 32 resonates with the oscillation of the float 30". The rotational inertial mass of the rotor 32 resonating with the oscillation of the float 30 enables to increase the power generation efficiency.

Figures 4, 5A:
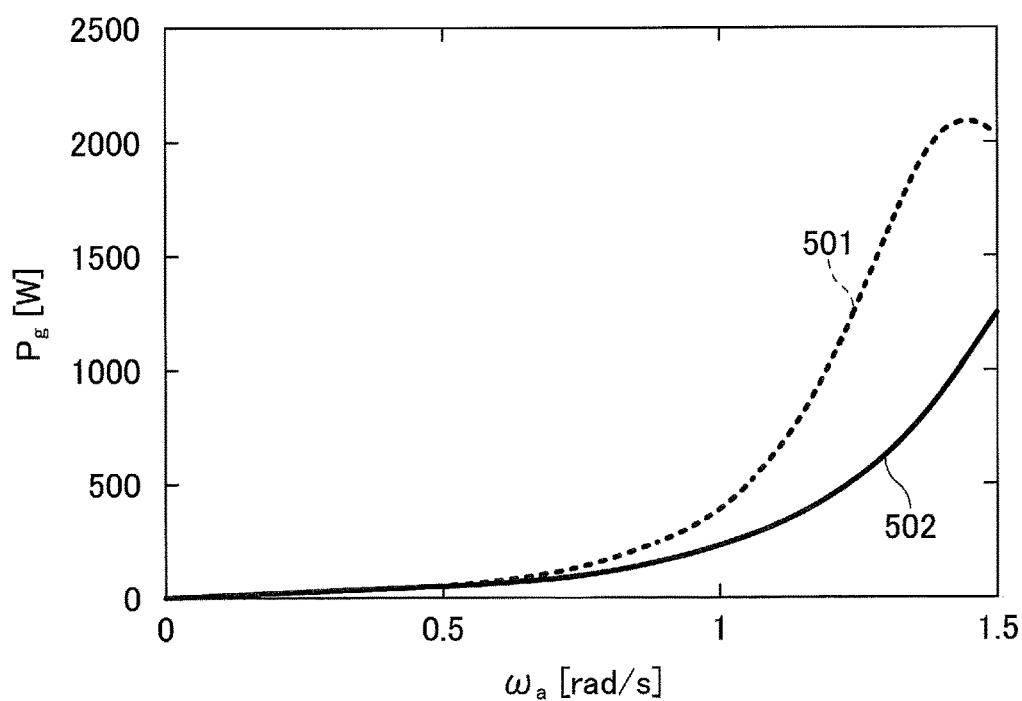
FIG. 4 is a table illustrating values of parameters used in the calculation example in FIG. 3.
FIG. 5A is a diagram illustrating numerical analysis results.

FIG. 3 is a table illustrating a result of calculating the power generation output Pg for each frequency $f_{ref}0$ when the rotational inertial mass $m_s$ of the rotor 32 and the admittance Y are changed under a constant value of the spring constant $k_t$. The values of the parameters used for FIG. 3 are as illustrated in FIG. 4.

In FIG. 3, the spring constant $k_t$ is a constant value (in this example, $3.9766 \times 10^3$), and it can be considered that the spring constant $k_t$ equal to this constant value constitutes an optimal solution together with the rotational inertial mass $m_s$ and the admittance Y.

For example, when the frequency $f_{ref}0 = \frac{1}{4}$ [1/s], the power generation output Pg becomes the maximum value (Pg=2464) when $m_s=1101$ and Y=0.001835. Therefore, in other words, when the frequency $f_{ref}0 = \frac{1}{4}$ and $m_s=1101$, $k_t=3.9766 \times 10^3$ and Y=0.001835 constitute an optimal solution. Similarly, when the frequency $f_{ref}0 = \frac{1}{5}$ [1/s], the power generation output Pg becomes the maximum value (Pg=1375) when $m_s=2010$ and Y=0.0011. Therefore, in other words, when the frequency $f_{ref}0 = \frac{1}{5}$ and $m_s=2010$, $k_t=3.9766 \times 10^3$ and Y=0.0011 constitute an optimal solution.

As can be seen in FIG. 3, according to the present example embodiment, the wave-activated power generation device 1 includes the tuning spring 41; therefore, it is possible to cause the rotational inertial mass of the rotor 32 to resonate with the oscillation of the float 30, and thereby, to increase the power generation efficiency. In other words, according to the present example embodiment, causing the rotational inertial mass of the rotor 32 to resonate with the oscillation of the float 30 enables to increase the rotational inertial mass effect so as to increase the power generation efficiency.

Figure 6:
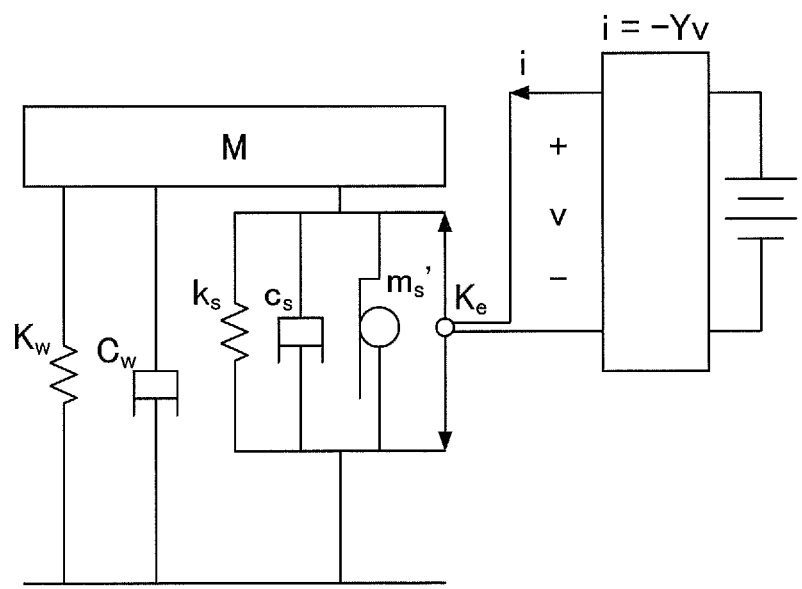
FIG. 6 is a diagram illustrating a model according to a comparative example.

For example, in the case of FIG. 3, if the spring constant $k_t$ is set to $k_t=3.9766 \times 10^3$, when the frequency $f_{ref}0=\frac{1}{4}$ and $m_S=1101$, the rotational inertial mass of the rotor 32 resonates with the oscillation of the float 30. When the rotational inertial mass of the rotor 32 resonates with the oscillation of the float 30, the rotational inertial mass effect can be increased to increase the power generation efficiency. Therefore, in this case, the power generation efficiency can be increased compared to a comparative example without a tuning spring 41 (i.e., $k_t \approx 0$) (see also FIG. 6).

Also, according to the present example embodiment, the wave-activated power generation device 1 includes the rotor 32 that generates a rotational inertial mass effect; therefore, it is possible to realize a significantly greater rotational inertial mass than the rotational inertial mass of the input shaft of the power generator 40. Also, by properly setting the rotational inertial mass of the rotor 32, it is possible to cause the rotational inertial mass of the rotor 32 to resonate with the oscillation of the float 30, and thereby, to increase the power generation efficiency.

For example, in the case of FIG. 3, if the rotational inertial mass $m_s$ of the rotor 32 is set to $m_s=1101$, the rotational inertial mass of the rotor 32 can resonate with the oscillation of the float 30 at a frequency $f_{ref}0=\frac{1}{4}$ and $k_t=3.9766 \times 10^3$, and thereby, can increase the rotational inertial mass effect so as to increase the power generation efficiency. Therefore, in this case, the power generation efficiency can be increased compared to the comparative example without the rotor 32 (i.e., $m_s \approx 0$) (see also FIG. 6).

Figure 5B:
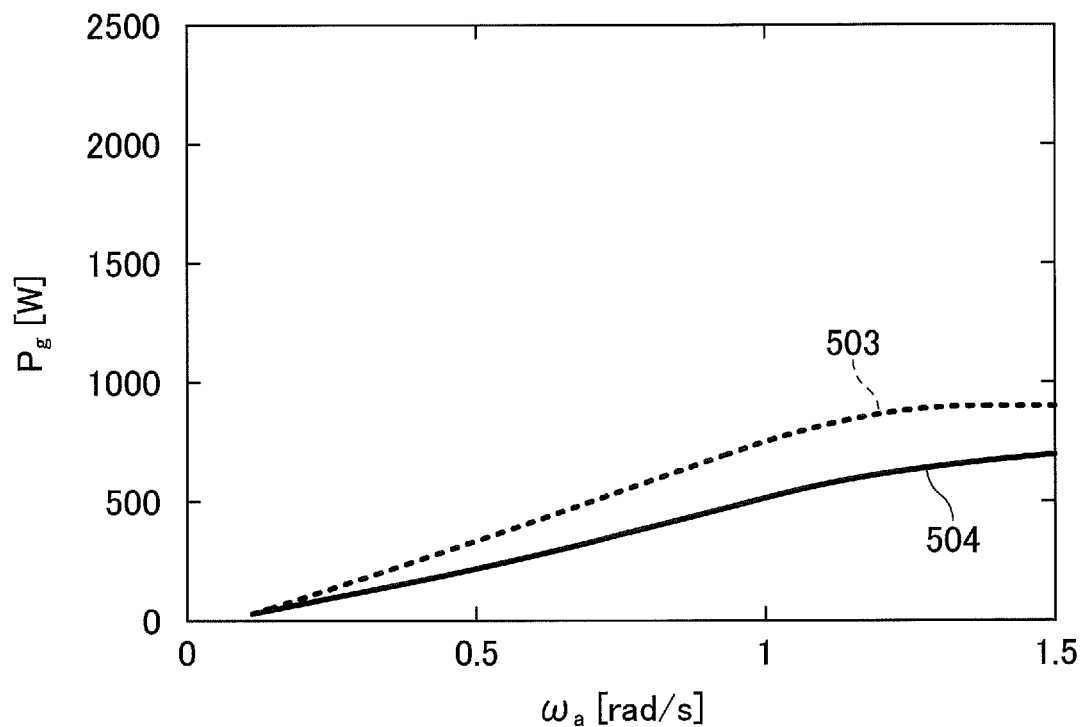
FIG. 5B illustrates other numerical analysis results.

FIGS. 5A and 5B are diagrams illustrating numerical analysis results. In FIGS. 5A and 5B, the horizontal axis represents the angular velocity $\omega_a$ [rad/s] corresponding to the period of a wave, and the vertical axis represents the power generation output Pg [W], to illustrate variation characteristics of the power generation output depending on the period of the wave. In FIG. 5A, a variation characteristic 501 is a characteristic according to the present example embodiment, and a variation characteristic 502 is a characteristic according to the comparison example illustrated in FIG. 6. Also, in FIG. 5B, a variation characteristic 503 is a characteristic according to the present example embodiment, and a variation characteristic 504 is a characteristic according to the comparison example illustrated in FIG. 6. As illustrated in a model in FIG. 6, the comparative example is configured not to include a tuning spring 41 and a rotor 32. Note that in FIG. 6, $m_s'$ represents the rotational inertial mass of the input shaft of the power generator, which is significantly smaller than the rotational inertial mass of the rotor 32.

FIG. 5A illustrates numerical analysis results where disturbance of waves is concentrated in a narrow band (narrow band as the frequency band of the waves) that is relatively similar to a sinusoidal wave, and FIG. 5B illustrates numerical analysis results when disturbance of waves is included in a broad band. It can be seen that from FIGS. 5A and 5B, according to the present example embodiment, compared to the comparative example, the power generation output can be increased in both cases of the wave disturbance including a narrow band and including a broad band. For example, it can be understood that the power generation output is significantly increased than in the comparative example, for waves with periods having the angular velocity around $\omega_a=1$, which are often observed on the Sea of Japan coast.

Meanwhile, as described above, even at the same location, the period of waves varies depending on changes in the environmental conditions; therefore, the frequency of the oscillation of the float 30 is not constant at all times and varies with changes in the environmental conditions.

In this regard, if it is possible to cause the rotational inertial mass of the rotor 32 to resonate with the oscillation of the float 30 even if the oscillation frequency of the float 30 changes, the high power generation efficiency can be maintained even if the environmental conditions are changed. In other words, by varying the three parameters of the admittance Y, the spring constant $k_t$, and the rotational inertial mass $m_s$ of the rotor 32 so as to cause the rotational inertial mass of the rotor 32 to resonate with the oscillation of the float 30 depending on the frequency of the oscillation of the float 30, the high power generation efficiency can be maintained even if the environmental conditions are changed.

Therefore, in the present example embodiment, any one or any combination of two among the three parameters of the admittance Y, the spring constant $k_t$, and the rotational inertial mass $m_s$ of rotor 32 may be varied depending on the frequency of the movement of the float. This enables to maintain the high power generation efficiency even if the environmental conditions are changed. Note that the frequency of the movement of the float may be calculated based on the period of waves as will be described later.

In this regard, the admittance Y can be varied by varying the duty ratio when turning the switching element of the control circuit 80 on and off as described above. Therefore, the change in the admittance Y can be realized by electronic control.

Also, the spring constant $k_t$ can be varied by providing multiple tuning springs 41 having different spring constants, and replacing the tuning springs 41. Therefore, the change in the spring constant $k_t$ can be realized manually or by work of a robot or the like.

Figure 7:
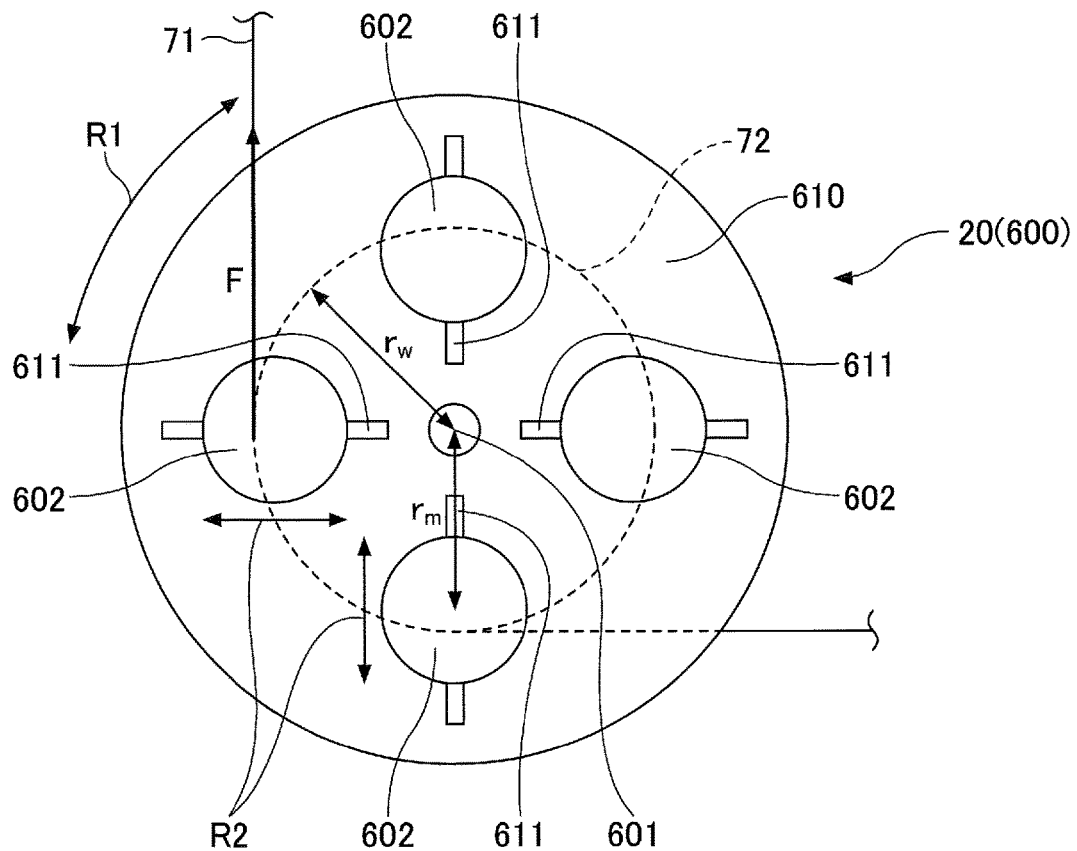
FIG. 7 is a schematic diagram of a variable mechanism of rotational inertial mass.

Also, the rotational inertial mass $m_s$ of the rotor 32 can be varied by providing multiple rotors 32 having different rotational inertial masses, and replacing the rotors 32. In this case, the change in the rotational inertial mass $m_s$ can be realized manually or by work of a robot or the like. Alternatively, the rotor 32 may be provided with a variable mechanism that makes the rotational inertial mass variable. An example of such a variable mechanism is illustrated schematically, for example, in FIG. 7. In FIG. 7, a rotating shaft 601 as the input shaft of the power generator 40, a wire 71 as an example of the drive part 50, and a gear 72 are schematically illustrated together with the variable mechanism.

In the example illustrated in FIG. 7, the rotor 32 including the variable mechanism is attached around the rotating shaft 601 of the power generator 40. The rotor 32 includes a disk-shaped member 610, which is fixed to the rotating shaft 601. The disk-shaped member 610 is fixed to the rotating shaft 601 in a form of being rotatable together with the rotating shaft 601 (see an arrow R1 indicating the rotation). Multiple radial grooves 611 (four grooves 611 in FIG. 7) are formed on the disk-shaped member 610. On each of the grooves 611, a weight 602 is provided to be movable in the radial direction (see arrows R2). According to such a variable mechanism 600, by varying the radial position of the weight 602, it is possible to vary the rotational inertial mass of the rotor 32.

Here, if the power transmission mechanism between the drive part 50 and the power generator 40 is the wire 71 with a chain and the gear 72 (the gear 72 engaging the chain), and denoting the angle of rotation of the power generator 40 by θ, the displacement of the wire 71 by x, and the radius of the gear 72 by $r_w$, the following relationship holds.

$$x = r_w \theta$$

Also, denoting the wire tension by F and the moment of inertia of the motor for power generation by I, the equation of motion of the rotation of the power generator 40 is expressed as follows:

$$Fr_w = I\ddot{\theta} \qquad \text{Formula 4}$$

Here, assuming that the moment of inertia I is given only by the weight 602 of the mass $m_0$ located at the radius $r_m$ (see FIG. 7), the moment of inertia I is expressed as follows:

$$I = r_m^2 m_0$$

By eliminating I and θ from the above, the tension F is expressed as follows:

$$F = \frac{r_m^2}{r_w^2} m_0 \ddot{x} \qquad \text{[Formula 5]}$$

This indicates that the wire 71 is provided with the following rotational inertial mass effect.

$$m_s = \frac{r_m^2}{r_w^2} m_0 \qquad \text{[Formula 6]}$$

Note that from Formula 5, it can be seen that by varying at least one of the radial position (radius $r_m$) of the weight 602 and the radius $r_w$ of the gear, the value of the rotational inertial mass $m_s$ can be varied. Therefore, the variable mechanism to make the rotational inertial mass variable may be implemented as a mechanism whose radius corresponding to the radius $r_w$ of the gear is variable (e.g., a mechanism in which the radius of a pulley is variable).

Next, with reference to FIG. 8 and thereafter, an example of a control method of the wave-activated power generation device 1 will be described. In the following, as an example, it is assumed that the spring constant $k_t$ of the tuning spring 41 is not variable. Also, in the following, as an example, a case of using a variable mechanism 600 is assumed.

Figure 8:
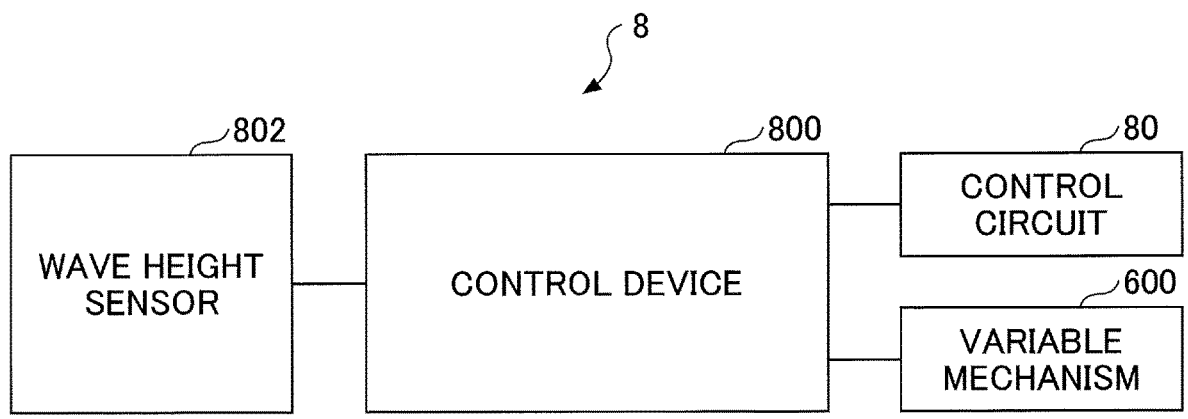
FIG. 8 is a diagram illustrating an example of a control system 8 of a wave-activated power generation device 1.

FIG. 8 is a diagram illustrating an example of a control system 8 of the wave-activated power generation device 1.

The control system 8 includes a control circuit 80, a variable mechanism 600, a control device 800, and a wave height sensor 802 (an example of a detector). The control circuit 80 is as described above. The control device 800 is constituted with, for example, by a computer. The wave height sensor 802 is a sensor to measure the height of a wave (an example of frequency information) at an installation location of the wave-activated power generation device 1. The wave height sensor 802 provides an electrical signal according to a measured value (a crest value) to the control device 800.

Figure 9:
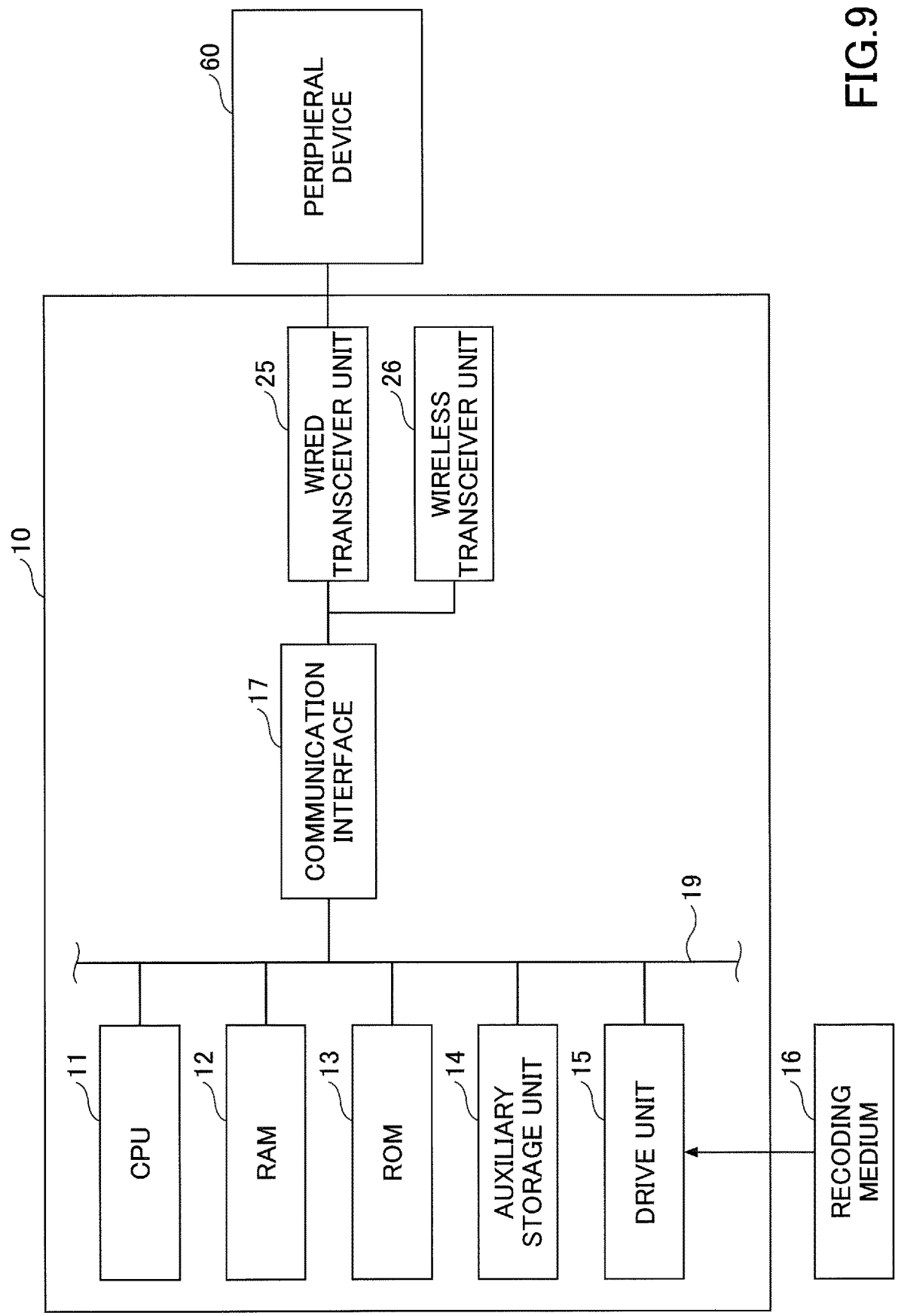
FIG. 9 is a diagram illustrating an example of a hardware configuration of a control device 800.

FIG. 9 is a diagram illustrating an example of a hardware configuration of the control device 800. In FIG. 9, a peripheral 60 is schematically illustrated in connection with the hardware configuration of the control device 800. The peripheral device 60 may include a control circuit 80, a wave height sensor 802, and the like.

The control device 800 includes a CPU (Central Processing Unit) 11, a RAM (Random Access Memory) 12, a ROM (Read-Only Memory) 13, an auxiliary storage device 14, a drive device 15, and a communication interface 17, which are mutually connected via a bus 19; and a wired transceiver 25 and a wireless transceiver 26 connected to the communication interface 17.

The auxiliary storage device 14 may be, for example, an HDD (hard disk drive) or an SSD (solid state drive), which is a storage device to store data related to application software and the like.

The wired transceiver 25 includes a transceiver capable of communicating over a wired network. A wired transceiver 25 is connected to the peripheral 60. However, a part or the entirety of the peripheral device 60 may be connected to the bus 19 or to the wireless transceiver 26.

Also, the wireless transceiver 26 may include an NFC (Near Field Communication) unit, a Bluetooth communication unit, a Wi-Fi (Wireless-Fidelity) transceivers, an infrared transceiver, and the like.

Note that the control device 800 may be connectable with a recording medium 16. The recording medium 16 stores a predetermined program. The program stored in the recording medium 16 is installed in the auxiliary storage device 14 of the control device 800 through the drive device 15. The installed predetermined program becomes executable by the CPU 11 of the control device 800. For example, the recording medium 16 may be a recording medium that optically, electrically, or magnetically records information, such as a CD (Compact Disc)-ROM, a flexible disk, a magneto-optical disk, or the like; or a semiconductor memory that electrically records information, such as a ROM, a flash memory, or the like.

Figures 10, 11:
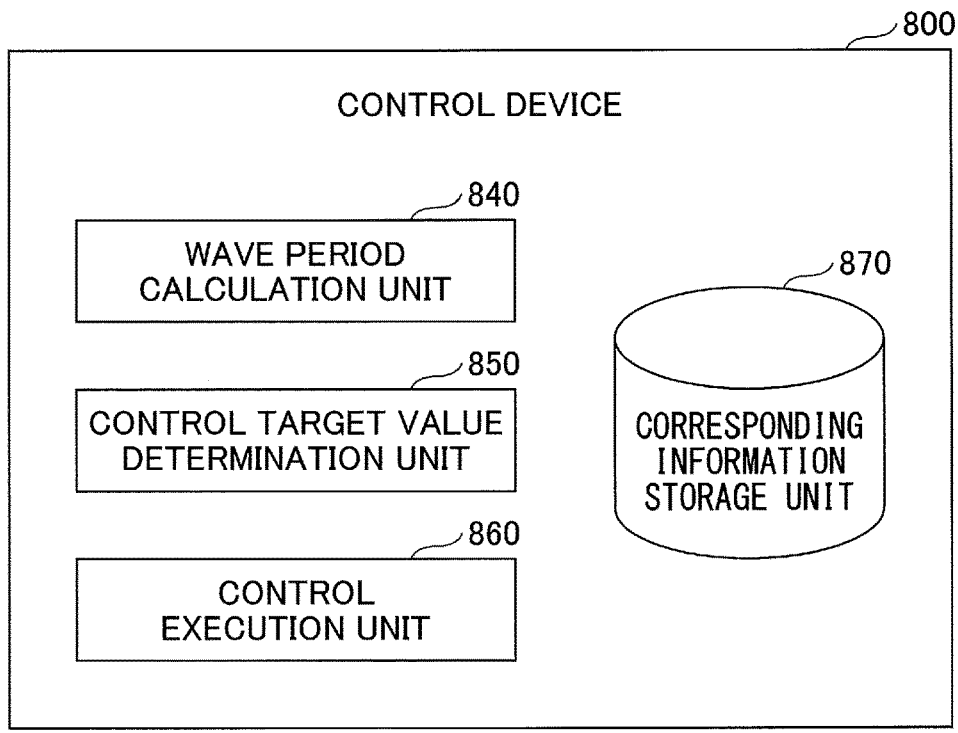
FIG. 10 is a functional block diagram illustrating an example of functions of the control device 800.
FIG. 11 is a diagram illustrating an example of corresponding relationship information.

FIG. 10 is a functional block diagram illustrating an example of functions of the control device 800. FIG. 11 is a diagram illustrating an example of corresponding relationship information.

The control device 800 includes a wave period calculation unit 840, a control target value determination unit 850, a control execution unit 860, and a corresponding information storage unit 870 (an example of a storage unit). The wave period calculation unit 840, the control target value determination unit 850, and the control execution unit 860 can be implemented, for example, by executing one or more programs in the ROM 13 by the CPU 11 illustrated in FIG. 9. The corresponding information storage unit 870 may be implemented, for example, by the auxiliary storage device 14 illustrated in FIG. 9.

The wave period calculation unit 840 calculates the period of waves based on time series information of crest values obtained from the wave height sensor 802. Note that a smoothing process may be applied to calculation of the period of the wave. In a smoothing process, a moving average method or the like may be used.

The control target value determination unit 850 determines control target values based on corresponding information in the corresponding information storage unit 870 and a result of the period of the waves calculated by the wave period calculation unit 840. The corresponding information is information representing a relationship among a frequency, a target value of the rotational inertial mass, and a target value of the admittance Y (see FIG. 11), which is stored in the corresponding information storage unit 870. In the following, the target value of the rotational inertial mass and the target value of the admittance Y are denoted as "target value $m_{tar}$" and "target value $Y_{tar}$," respectively.

In the corresponding information illustrated in FIG. 11, the target value $m_{tar}$ of the rotational inertial mass (m1, m2, etc.) and the target value $Y_{tar}$ of the admittance Y (Y1, Y2, etc.) of the admittance Y are associated with each other for each frequency range. For example, if the frequency range=fa1 to fa2, the target value of the rotational inertial mass $m_{tar}$=m1 and the target value of the admittance Y=Y1. The corresponding information is defined for each frequency range such that the rotational inertial mass of the rotor 32 virtually resonates with the oscillation of the float 30 if the target value $m_{tar}$ of the associated rotational inertial mass and the target value $Y_{tar}$ of the admittance Y are realized. Therefore, when the frequency of the oscillation of the float 30 falls within fa1 to fa2, if the rotational inertial mass $m_s$ becomes m1 and the admittance Y becomes Y1, then, the rotational inertial mass of the rotor 32 virtually resonates with the oscillation of the float 30.

In the case of FIG. 11, the control target value determination unit 850 first calculates a frequency (frequency of the oscillation of the float 30) corresponding to the period of the waves based on the calculation result of the period of the waves by the wave period calculating unit 840. For example, if the period of the waves=$t_w$, the frequency corresponding to the period of the waves may be set to $1/t_w$. Then, the control target value determination unit 850 determines the target value $m_{tar}$ of the rotational inertial mass and the target value $Y_{tar}$ of the admittance Y corresponding to the frequency range to which the calculated value of the frequency according to the period of the waves belongs as the control target values.

Based on the control target values determined by the control target value determination unit 850, the control execution unit 860 controls the control circuit 80 and the variable mechanism 600. Specifically, the control execution unit 860 issues a command to the control circuit 80 so as to realize the target value $Y_{tar}$ of the admittance Y. In response to this command, the control circuit 80 varies the duty ratio of on and off of the switching element so that the admittance Y approaches the target value $Y_{tar}$. Also, similarly, the control execution unit 860 issues a command to an actuator (not illustrated) of the variable mechanism 600 so as to realize the target value $m_{tar}$ of the rotational inertial mass. In response to this command, the actuator varies the radial position (radius $r_m$) of the weight 602 so that the rotational inertial mass approaches the target value $m_{tar}$.

Thus, according to the control system 8 of the wave-activated power generation device 1 in the present example embodiment, the target value $Y_{tar}$ of the admittance Y and the target value $m_{tar}$ of the rotational inertial mass are determined based on crest values obtained from the wave height sensor 802. Then, the power generator 40 and variable mechanism 600 are controlled so as to realize the target value $Y_{tar}$ of the admittance Y and the target value $m_{tar}$ of the rotational inertial mass. This enables the control target values to automatically change in response to a change in the period of waves caused by a change in the environmental conditions. As a result, high generation efficiency can be maintained even when the period of waves changes.

Figure 12:
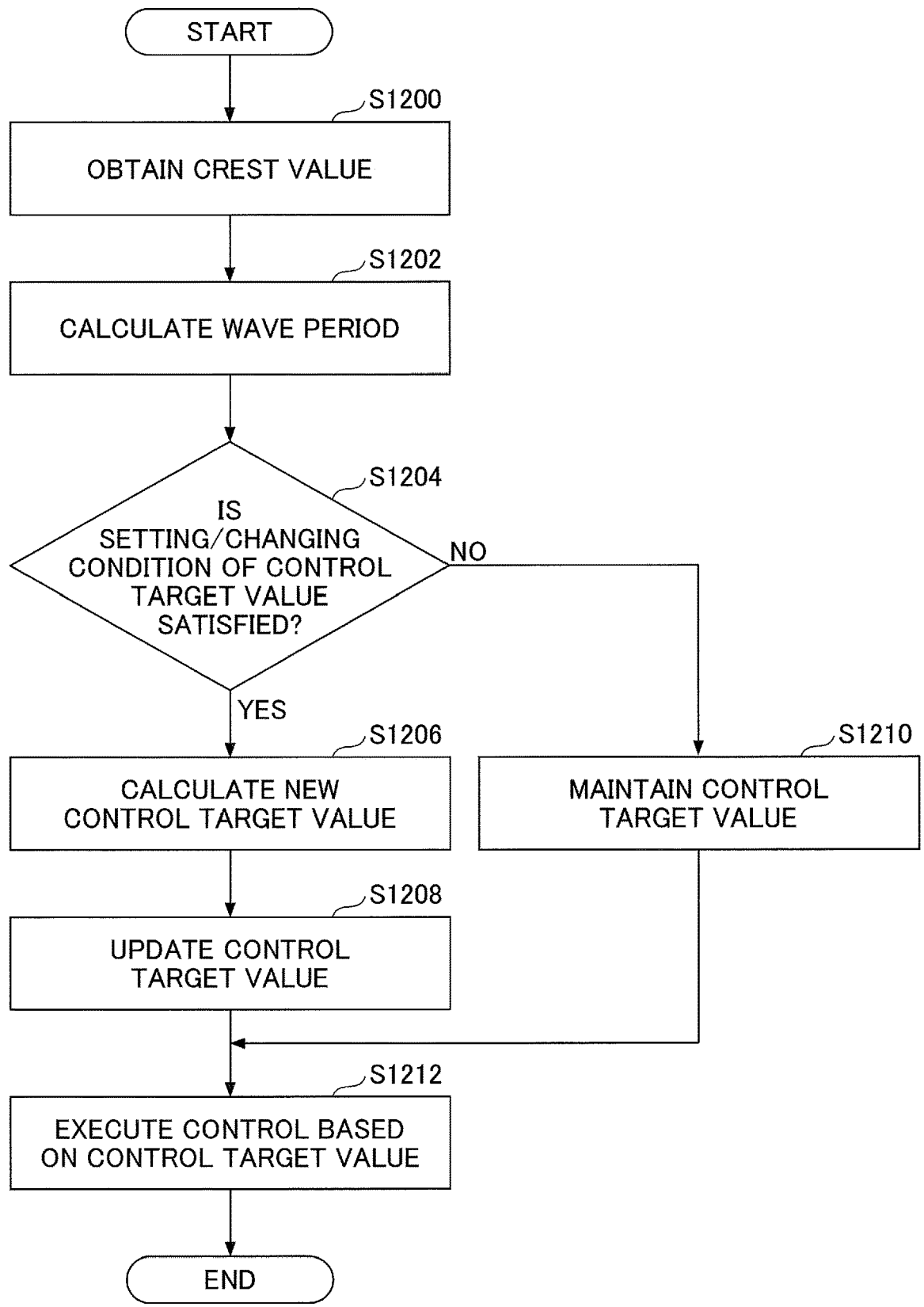
FIG. 12 is a schematic flow chart illustrating an example of operations of the control device 800.

FIG. 12 is a schematic flow chart illustrating an example of operations of the control device 800. The process illustrated in FIG. 12 may be repeated for predetermined periods.

At Step S1200, the wave period calculation unit 840 obtains a crest value in the current period from the wave height sensor 802.

At Step S1202, the wave period calculation unit 840 calculates the period of waves based on wave heights (in time series) obtained at Step S1200 over multiple periods prior to the current period.

At Step S1204, the control target value determination unit 850 determines whether or not setting/changing conditions of the control target values are satisfied based on the period of the waves obtained at Step S1202. Note that it is assumed in initial periods, the setting/changing conditions of the control target values are satisfied. The setting/changing conditions of the control target values are satisfied when, for example, the frequency related to the period of the waves obtained at Step S1202 deviates from the frequency range of the current control target values. If the determination result is "YES," the process proceeds to Step S1206; otherwise, the process proceeds to Step S1210.

At Step S1206, the control target value determination unit 850 determines the control target values corresponding to the period of the waves obtained at Step S1202, based on the period of the waves obtained at Step S1202 and the corresponding information in the corresponding information storage unit 870. Specifically, as described above, the control target value determination unit 850 identifies the frequency range to which the frequency related to the period of the waves obtained at Step S1202 belongs, to determine the target value $m_{tar}$ of the rotational inertial mass and the target value $Y_{tar}$ of the admittance Y as new control target values corresponding to the frequency range.

At Step S1208, the control target value determination unit 850 updates the current values of the control target values with the new control target values obtained at Step S1206.

At Step S1210, the control target value determination unit 850 maintains the previous values of the control target values as the current values.

At Step S1212, the control execution unit 860 controls the control circuit 80 and the variable mechanism 600, based on the current values of the control target values obtained at Step S1208 or Step S1210.

According to the process illustrated in FIG. 12, it is possible to calculate the period of waves for each predetermined period, and to dynamically change the control target values according to a change in the period of the waves.

As above, the preferable example embodiments of the present invention have been described in detail.

Note that the present invention is not limited to the example embodiments described above, and various modifications and substitutions can be made to the example embodiments described above without departing from the scope of the present invention.

Figure 13:
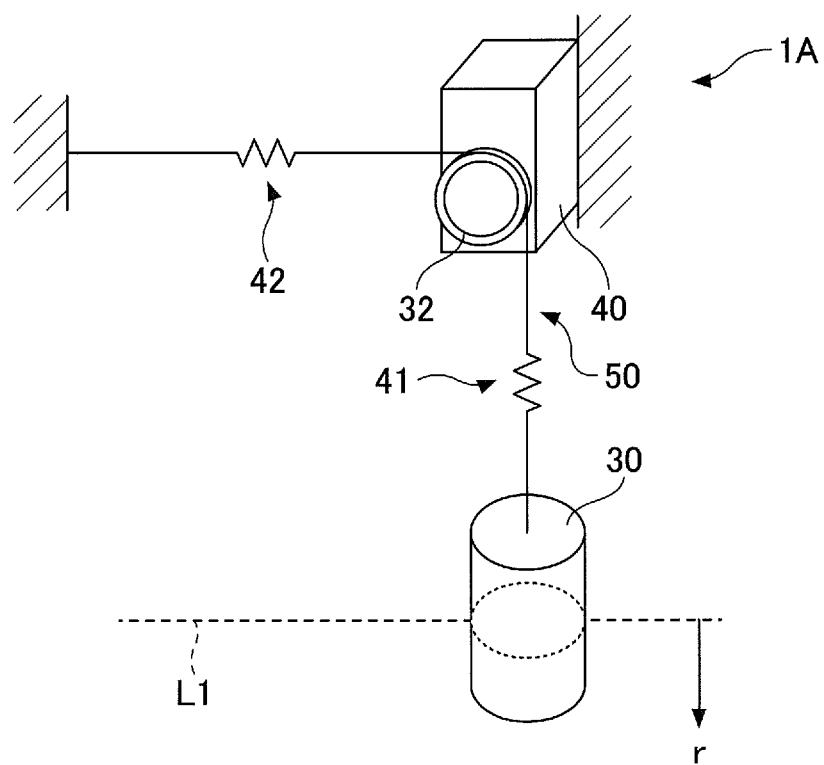
FIG. 13 is an explanatory view of another installation method.

For example, in the example embodiment, the rotor 32, the power generator 40, and the like of the wave-activated power generation device 1 are installed under the sea, but these are not limited as such. For example, components other than a float (a rotor 32, a power generator 40, etc.) may be installed on land, as a wave-activated power generation device 1A illustrated in a schematic diagram of FIG. 13.

Also, in the example embodiment described above, although the supporting spring 42 is a linear spring, it may be a constant load spring. Also, in the example illustrated in FIG. 13, the supporting spring 42 may be replaced with a combination of a pulley and a counterweight. In this case, the combination of the pulley and the counterweight can realize a mechanism to prevent the drive part 50 from loosening due to movement of the float 30.

Also, in the example embodiment described above, an accelerometer for detecting acceleration of the float 30 (an example of frequency information) may be used instead of or in addition to the wave height sensor 802. In this case, the period of the waves can be derived based on a time series of the acceleration of the float 30. Note that acceleration may be detected along each of the three axes, or only the vertical component may be detected.

Here, with reference to FIGS. 14A to 14C, the advantages of the present invention will be described by comparing conventional models with a model of the example embodiment. In principle, all three models illustrated in FIGS. 14A-14C are configured as dynamic vibration absorbers, which generate a resonant effect by adding an auxiliary mass or a rotational inertial mass through a spring so as to increase the energy absorption effect.

Figure 14A:
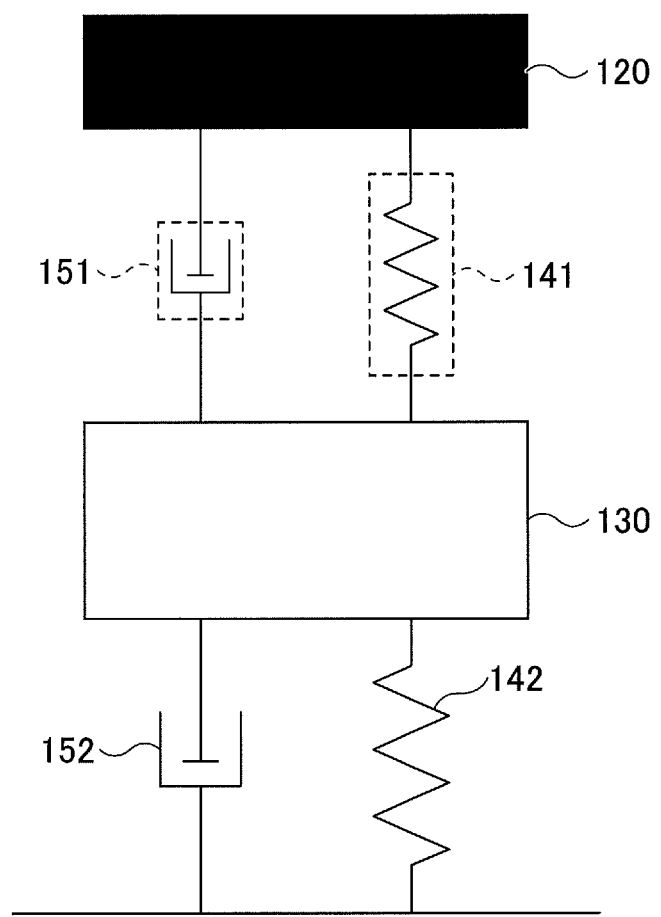
FIG. 14A illustrates a first conventional model.

FIG. 14A illustrates a first conventional model described in Japanese Laid-Open Patent Application No. 2017-132336, Japanese Laid-Open Patent Application No. 2016-144249, and the like. In FIG. 14A, an additional normal mass 120, a buoy 130, a tuning spring 141, a buoyancy 142, damping by water 152, and damping by a motor 151 are illustrated. Note that the same elements as those illustrated in FIG. 14A are illustrated in FIGS. 14B and 14C by using the same reference codes, and the description of those will be omitted.

FIG. 14A uses the general principle of the dynamic vibration absorber, and it is difficult to achieve a large additional mass; therefore, it is difficult to obtain a large displacement, and a high generation efficiency cannot be expected.

Figure 14B:
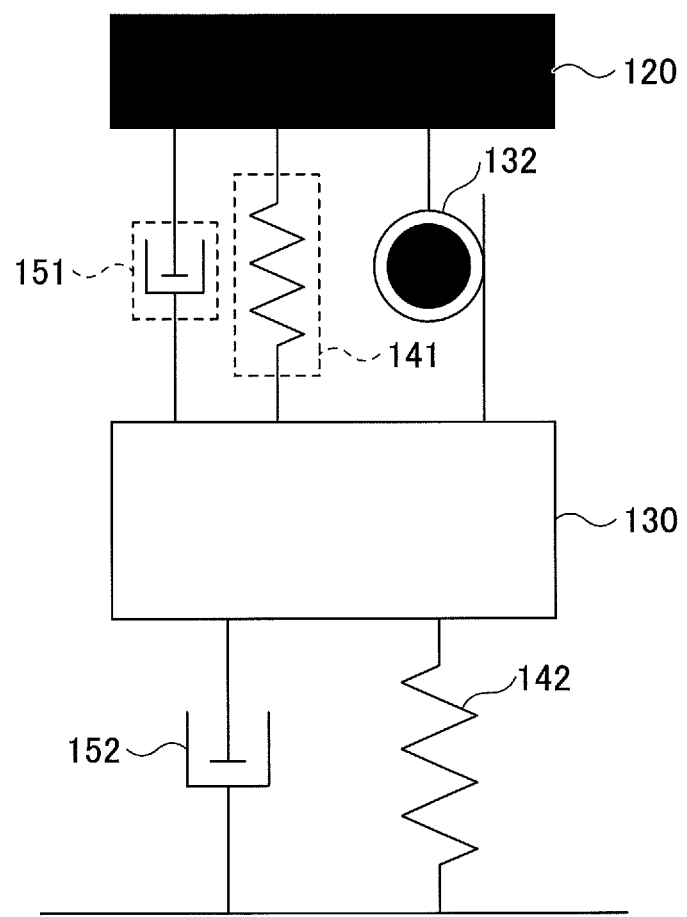
FIG. 14B illustrates a second conventional model.
Figure 14C:
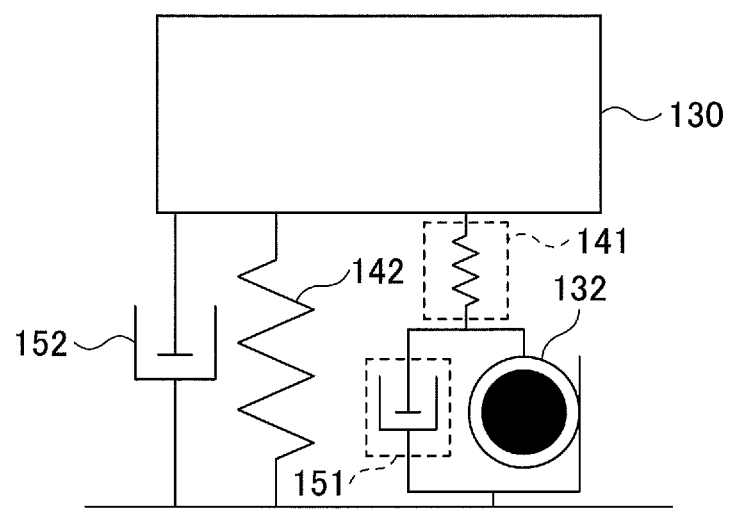
FIG. 14C illustrates a model of an example embodiment.

FIG. 14B illustrates a second conventional model described in Japanese Laid-Open Patent Application 2013-155609. In FIG. 14B, in addition to the elements as illustrated in FIG. 14, a large mass is realized by using an additional mass 132 caused by rotational inertia.

However, it is difficult to obtain a displacement to reach that of the example embodiment model illustrated in FIG. 14C; therefore, the power generation efficiency does not reach that of the example embodiment model illustrated in FIG. 14C. Also, the mechanism is complicated due to doubly attached additional masses including the additional mass 132 caused by the rotational inertia.

FIG. 14C illustrates a model of the example embodiment. The model of the example embodiment can provide a motor with a significantly amplified displacement compared to the displacement of the buoy 130, and thereby, a high power generation effect can be obtained. Also, the additional mass does not need to be doubly attached as in the second conventional model illustrated in FIG. 14B; therefore, it can be constructed with a relatively simple mechanism.

FIG. 15 is a diagram comparing the power generation efficiency and the mechanism simplicity of the respective models in FIGS. 14A to 14C. As indicated in FIG. 15, the first conventional model in FIG. 14A has an excellent (denoted with a circle mark) mechanistic simplicity, but has a poor (denoted with a cross mark) power generation efficiency. The second conventional model in FIG. 14B has a power generation efficiency better (denoted with a triangle mark) than that of FIG. 14A; however, the mechanism is complicated, and hence, is inferior in simplicity of the mechanism.

In contrast, the model of the example embodiment in FIG. 14C is somewhat more complex in terms of the simplicity of the mechanism than the first conventional model in FIG. 14A, but is simpler than the second conventional model in FIG. 14B, and the power generation efficiency is greatly improved compared to the first and second conventional models in FIGS. 14A and 14B. As such, it can be understood that the model of the example embodiment can significantly improve the power generation efficiency while maintaining the simplicity of the mechanism.

As above, the present invention has been described with reference to the example embodiments. Note that the present invention is not limited to the above example embodiments, and various modifications can be made within the scope of the claims.

The present application claims priority to Base Application No. 2017-158848, filed Aug. 21, 2017, with the Japan Patent Office, the entire contents of which are hereby incorporated by reference.

LIST OF REFERENCE CODES 1 wave-activated power generation device
8 control system
30 float
32 rotor
40 power generator
41, 141 tuning spring
42 supporting spring
50 drive part
80 control circuit
120 additional normal mass
130 buoy
132 additional rotational inertial mass
142 buoyancy
151 damping by a motor
152 damping by water
600 variable mechanism
601 rotating shaft
602 weight
800 control device
802 wave height sensor
840 wave period calculator
850 control target value determination unit
860 control execution unit
870 corresponding information storage

The invention claimed is:

1. A wave-activated power generation device comprising:
a float configured to be capable of floating in the sea;
a rotor configured to generate a rotational inertial mass effect;
a power generator configured to generate power based on rotation of the rotor;
a first elastic body; and
a drive part configured to connect the rotor with the float via the first elastic body so as to rotate the rotor along with movement of the float,
wherein a spring constant of the first elastic body is set so as to cause a rotational inertial mass of the rotor to resonate with oscillation of the float, to provide the power generator with a displacement greater than a displacement of the float.

2. The wave-activated power generation device as claimed in claim 1, further comprising:
a second elastic body,
wherein the drive part further connects the rotor with a stationary object via the second elastic body.

3. The wave-activated power generation device as claimed in claim 2, wherein the drive part has a linear form in which one end is connected to the float and another end is connected to the stationary object, and
wherein the second elastic body is maintained to have an elongation of zero or greater while the rotor is rotating.

4. The wave-activated power generation device as claimed in claim 1, wherein the rotor includes a variable mechanism configured to make a rotational inertial mass variable.

5. The wave-activated power generation device as claimed in claim 4, wherein the rotational inertial mass varies depending on a frequency of the movement of the float.

6. The wave-activated power generation device as claimed in claim 5, further comprising:
a control device,
wherein the control device varies the rotational inertial mass depending on the frequency of the movement of the float by electronic control.

7. The wave-activated power generation device as claimed in claim 6, further comprising:
a detector configured to detect frequency information related to the frequency of the movement of the float,
wherein the control device includes a storage unit configured to store corresponding information representing a corresponding relationship between a frequency range and at least one of a target value of a rotational inertial mass and a target value of a power generator admittance,
wherein the control device brings at least one of the rotational inertial mass and the admittance closer to one of the target values corresponded with the frequency range to which the frequency represented by the frequency information belongs, based on the frequency information and the corresponding information.

8. A wave-activated power generation method, the method comprising:
using a drive part configured to connect a rotor with a float via a first elastic body so as to rotate the rotor along with movement of the float, wherein a float is configured to be capable of floating in the sea, and the rotor is configured to generate a rotational inertial mass effect; and
generating power by a power generator configured to generate the power based on rotation of the rotor,
wherein a spring constant of the first elastic body is set so as to cause a rotational inertial mass of the rotor to resonate with oscillation of the float, to provide the rower generator with a displacement greater than a displacement of the float.

* * * * *